US011703881B2

(12) United States Patent
Chen et al.

(10) Patent No.: US 11,703,881 B2
(45) Date of Patent: Jul. 18, 2023

(54) METHOD OF CONTROLLING A GUIDE MACHINE AND A NAVIGATION SYSTEM

(71) Applicant: Logistics and Supply Chain MultiTech R&D Centre Limited, Pok Fu Lam (HK)

(72) Inventors: Xiao Sheng Chen, Pok Fu Lam (HK); Guang Bo Li, Pok Fu Lam (HK); Kin Keung Lee, Pok Fu Lam (HK); Leung Chiu, Pok Fu Lam (HK)

(73) Assignee: Logistics and Supply Chain Multi Tech R&D Centre Limited, Pok Fu Lam (HK)

( * ) Notice: Subject to any disclaimer, the term of this patent is extended or adjusted under 35 U.S.C. 154(b) by 102 days.

(21) Appl. No.: 16/823,558

(22) Filed: Mar. 19, 2020

(65) Prior Publication Data

US 2021/0294347 A1      Sep. 23, 2021

(51) Int. Cl.
    *G05D 1/02*      (2020.01)
    *G05D 1/00*      (2006.01)

(52) U.S. Cl.
    CPC ......... *G05D 1/0259* (2013.01); *G05D 1/0022* (2013.01); *G05D 1/0033* (2013.01); *G05D 1/0238* (2013.01); *G05D 1/0242* (2013.01); *G05D 1/0255* (2013.01)

(58) Field of Classification Search
    CPC .. G05D 1/0259; G05D 1/0022; G05D 1/0033; G05D 1/0238; G05D 1/0242; G05D 1/0255
    See application file for complete search history.

(56) References Cited

U.S. PATENT DOCUMENTS

| 8,314,736 | B2 * | 11/2012 | Moshfeghi | G01S 5/0236 342/465 |
| 9,680,512 | B2 * | 6/2017 | Chen | H04B 1/12 |
| 11,424,539 | B2 * | 8/2022 | Alpman | H01L 23/552 |
| 2006/0293794 | A1 * | 12/2006 | Harwig | G05D 1/0261 180/23 |
| 2007/0152830 | A1 * | 7/2007 | Burr | H01Q 1/2216 340/572.7 |
| 2012/0249302 | A1 * | 10/2012 | Szu | G06K 7/10297 235/492 |
| 2017/0160098 | A1 * | 6/2017 | Mcgavran | G01C 21/3626 |
| 2017/0222315 | A1 * | 8/2017 | Hozouri | H04B 17/27 |
| 2019/0047472 | A1 * | 2/2019 | Chaaya | G01S 13/931 |
| 2019/0283780 | A1 * | 9/2019 | Boulanger | G06F 3/016 |
| 2020/0019181 | A1 * | 1/2020 | Kim | G05D 1/0238 |

(Continued)

*Primary Examiner* — Khoi H Tran
*Assistant Examiner* — Aaron G Cain
(74) *Attorney, Agent, or Firm* — Renner, Kenner, Greive, Bobak, Taylor & Weber

(57) ABSTRACT

A method of controlling a guide machine and a navigation system. The navigation system includes: a plurality of signal sources deployed in a predetermined area; a guide machine including a signal receiver arranged to receive electromagnetic signals emitted from one or more of the plurality of signal sources; and a processor arranged to process the electromagnetic signals to identify the locations of the signal sources, and thereby to determine a current position of the guide machine with reference to the locations of the signal sources; and the processor is further arranged to determine a path for the guide machine to travel from the current position to a destination location in the predetermined area.

22 Claims, 3 Drawing Sheets

(56) References Cited

U.S. PATENT DOCUMENTS

2020/0074857 A1* 3/2020 Karabinis ............... H04L 67/18
2021/0121035 A1* 4/2021 Kim ..................... H04B 17/318
2021/0154086 A1* 5/2021 Crosby ................. A61H 3/061

* cited by examiner

METHOD OF CONTROLLING A GUIDE MACHINE AND A NAVIGATION SYSTEM

TECHNICAL FIELD

The present invention relates to a method of controlling a guide machine and a navigation system, and particularly, although not exclusively, to a robotic guide dog based on RFID-technologies.

BACKGROUND

A commonly used tool to present directional or guidance information to users or patrons is to use visual signage or reference points so as to communicate guidance and location information to users. However, for people with visual impairment, visual signage may not be useful or offer any significant assistance and thus there is a need for an alternative form of navigational assistance.

Tactile signage such as tactile tiles paved on floor surfaces may be one possible solution to assist visually impaired persons with navigation. These tactile signs may have a predefined shape and layout which provide a tactile feel to a user when the user steps or touches the tile. Whilst these tactile signs are helpful in providing reference information, they are limited in the assistance rendered to users.

Alternatively, some users may prefer relatively active assistances provided by guide dogs, which are professionally trained to guide the user travelling to different destinations. However, guide dogs may be usually trained to memorize only a few fix routes and destination points, and thus limit the place that a blind person may travel by relying on guide dogs.

SUMMARY OF THE INVENTION

In accordance with a first aspect of the present invention, there is provided a method of controlling a guide machine, comprising the steps of: receiving electromagnetic signals emitted from one or more of a plurality of signal sources disposed in a predetermined area; processing the electromagnetic signals to identify the locations of the signal sources; determining a current position of the guide machine with reference to the locations of the signal sources; and determining a path for the guide machine to travel from the current position to a destination in the predetermined area.

In an embodiment of the first aspect, the electromagnetic signals are transmitted in orthogonal directions.

In an embodiment of the first aspect, the electromagnetic signals are transmitted in a linear polarization.

In an embodiment of the first aspect, each of the plurality of signal sources is arranged to emit electromagnetic signals in both orthogonal directions along a plane.

In an embodiment of the first aspect, the step of processing the electromagnetic signals include determining a distance and a direction of each the signal sources based on a signal strength of each of the electromagnetic signals emitted by each respective signal source in both orthogonal directions.

In an embodiment of the first aspect, the step of receiving electromagnetic signals include receiving signals emitted from the plurality of signal sources with a plurality of antennas surrounding the guide machine along the plane.

In an embodiment of the first aspect, the step of receiving electromagnetic signals further comprises the step of sequentially receiving electromagnetic signals in each respective direction of the plurality of antennas in each detection interval.

In an embodiment of the first aspect, the method further comprises the step of: detecting an obstacle on the path; and determining an alternative path for the guide machine to travel from the current position to the destination.

In an embodiment of the first aspect, the method further comprises the step of informing a user of the guide machine a detection of the obstacle.

In an embodiment of the first aspect, the method further comprises the step of: providing instructions associated with travelling along path to a user of the guide machine using tactile signals.

In an embodiment of the first aspect, the tactile signals include vibration signals with different vibration patterns, frequencies and/or strengths.

In accordance with a second aspect of the present invention, there is provided a navigation system comprising: a plurality of signal sources deployed in a predetermined area; a guide machine including a signal receiver arranged to receive electromagnetic signals emitted from one or more of the plurality of signal sources; and a processor arranged to process the electromagnetic signals to identify the locations of the signal sources, and thereby to determine a current position of the guide machine with reference to the locations of the signal sources; and the processor is further arranged to determine a path for the guide machine to travel from the current position to a destination location in the predetermined area.

In an embodiment of the second aspect, the electromagnetic signals are transmitted in orthogonal directions.

In an embodiment of the second aspect, the electromagnetic signals are transmitted in a linear polarization.

In an embodiment of the second aspect, each of the plurality of signal sources is arranged to emit electromagnetic signals in both orthogonal directions along a plane.

In an embodiment of the second aspect, the processer is arranged to determine a distance and a direction of each the signal sources based on a signal strength of each of the electromagnetic signals emitted by each respective signal source in both orthogonal directions.

In an embodiment of the second aspect, the guide machine comprises a plurality of antennas surrounding the guide machine along the plane arranged to receive signals emitted from the plurality of signal sources.

In an embodiment of the second aspect, the signal receiver is arranged to sequentially receive electromagnetic signals in each respective direction of the plurality of antennas in each detection interval.

In an embodiment of the second aspect, the plurality of antennas include a plurality of unidirectional antennas.

In an embodiment of the second aspect, the plurality of antennas are electromagnetically separated so as to minimize mutual coupling between adjacent pairs of antennas.

In an embodiment of the second aspect, the guide machine further comprises an electromagnetic isolator disposed between each of the adjacent pairs of antennas.

In an embodiment of the second aspect, the signal reader includes a multi-channel RFID reader.

In an embodiment of the second aspect, each of the plurality of signal sources include two orthogonally arranged RFID tags.

In an embodiment of the second aspect, the guide machine further comprises at least one sensor arranged to detect an obstacle on the path.

In an embodiment of the second aspect, the processor is further arranged to, in response to the detection of the obstacle, determine an alternative path for the guide machine to travel from the current position to the destination.

In an embodiment of the second aspect, the at least one sensor includes at least one of an infrared sensor and an ultrasonic sensor.

In an embodiment of the second aspect, the guide machine further comprises a handle arranged to provide instructions associated with travelling along the path to a user of the guide machine using tactile signals.

In an embodiment of the second aspect, the tactile signals include vibration signals with different vibration patterns, frequencies and/or strengths.

In an embodiment of the second aspect, the navigation system further comprises an input module arranged to receive an input of the destination in the predetermined area.

In an embodiment of the second aspect, the guide machine includes a robotic guide vehicle.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
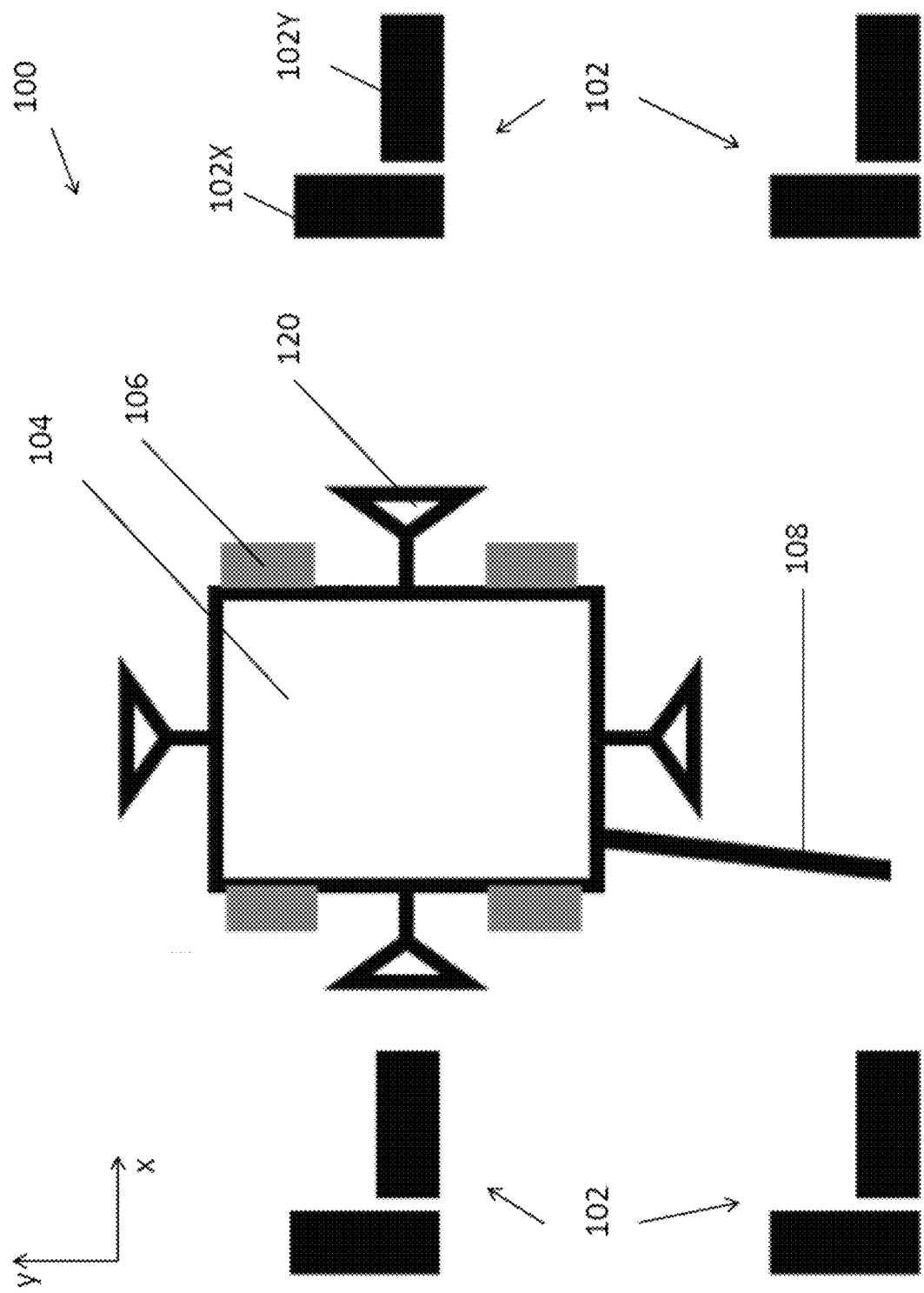
FIG. 1 is a schematic diagram showing a guide machine and four RFID signal sources of a navigation system in accordance with an embodiment of the present invention.

With reference to FIG. 1, there is shown an embodiment of a navigation system 100 comprising: a plurality of signal sources 102 deployed in a predetermined area; a guide machine 104 including a signal receiver arranged to receive electromagnetic signals emitted from one or more of the plurality of signal sources 102; and a processor arranged to process the electromagnetic signals to identify the locations of the signal sources 102, and thereby to determine a current position of the guide machine 104 with reference to the locations of the signal sources 102; and the processor is further arranged to determine a path for the guide machine 104 to travel from the current position to a destination location in the predetermined area.

In this embodiment, the guide machine 104 has four wheels 106 for driving the guide machine 104 to move along a surface, such as a ground surface. The guide machine 104 also includes a handle 108 which may be held by a user, such that the guide machine 104 may navigate and actively guide the user to move from one position to another. In one example, the guide machine 104 may be used as a robotic guide vehicle or a robotic guide dog for user with visual impairment.

Preferably, the wheels are only provided for facilitate a smooth movement of the guide machine on a surface. Alternatively, one or more of the wheels may be active or motorized wheels that may assist the user to walk along the path.

The handle 108 may also provide instructions associated with travelling along the path to a user of the guide machine 104 using tactile signals. Alternatively, the guidance/navigation information may be provided to the user using other means, such as but not limited to audio signal that may be provided directly to the user via earphones.

Referring to FIG. 1, the guide machine 104 further includes four antennas 120 surrounding the guide machine 104, preferably at each side of the guide machine 104 when place on a plane surface. The plurality of antennas 120 are arranged to receive signals emitted from the signal sources 102. By determining the distance and direction of each of multiple signal sources 102 fixed on a plane, the guide machine 104 may thereby determine a current position, e.g. using a triangulation positioning method.

For example, the signal sources 102 may be RFID tags array under the ground surface, and the tags 102 may emit RFID signals containing the UID of the tags to the RFID reader (not shown) in the guide machine 104. The RFID reader may be a multi-channel RFID reader, and the antenna 120 may be RFID antennas which may be individually activated.

Preferably, the electromagnetic signals are transmitted in orthogonal directions, e.g. by deploying signal sources 102 under the ground surface, during operation, the RFID signal sources 102 may emit electromagnetic signals in both orthogonal directions along a (2D) plane. Referring to FIG. 1, at each location with a signal source 102, two orthogonally arranged RFID tags (102X and 102Y) are deployed, and therefore the signals emitted from the two tags (102X and 102Y) will include signal emitted along the X-direction and the Y-direction. Alternatively, a single tag which emits signals in orthogonal directions may be used.

Preferably, the plurality of antennas 120 may be unidirectional antennas such that when one of these antennas 120 is activated, the antenna 120 may communicate with RFID tags 102 which are "facing" to such an antenna 120. For example, the antenna 120 on the right may communicate with tags 102 on the right side of the guide machine 104, in particular, only those tags 102X which emit RF signals along the X-direction. Advantageously, this allows the processor to more accurately extract the information associated with angular positions of the tags 102 with respect to the guide machine 104.

In an alternative embodiment, more antennas may be used to enhance the accuracy of the navigation system, by providing more positioning information to the processor. For example, 4 additional antennas may be installed at corners of the guide machine 104 which add up to a total number of 8 antennas radially distributed around the guide machine 104.

Optionally or additionally, the plurality of antennas 120 are electromagnetically separated so as to minimize mutual coupling between adjacent pairs of antennas 120, for example, by providing an electromagnetic isolator (not shown) disposed between each of the adjacent pairs of antennas.

Upon receiving the necessary position information from the tags 102, the processor will then able to determine a distance and a direction of each the signal sources 102 based on signal strength of each of the electromagnetic signals emitted by each respective signal source 102 in both orthogonal directions.

For example, referring to FIG. 1, the antenna 120 on the left side of the guide machine 104 is closer to the tag 102 on the left and therefore the signal strength is higher when compare to that the source-antenna pair on the right. Therefore, the processor may determine that the guide machine 104 is now in a position closer to the left column of the RFID tag array than those on the right, by analyzing the signal parameters and estimate the relative position of the tags 120 accordingly.

Preferably, the signal receiver is arranged to sequentially receive electromagnetic signals in each respective direction of the plurality of antennas 120 in each detection interval, such that all the tags 102 in the detectable range of the guide machine 104 will be detected periodically. The processor may then update the current position of the guide machine 104 from time to time.

Figure 2:
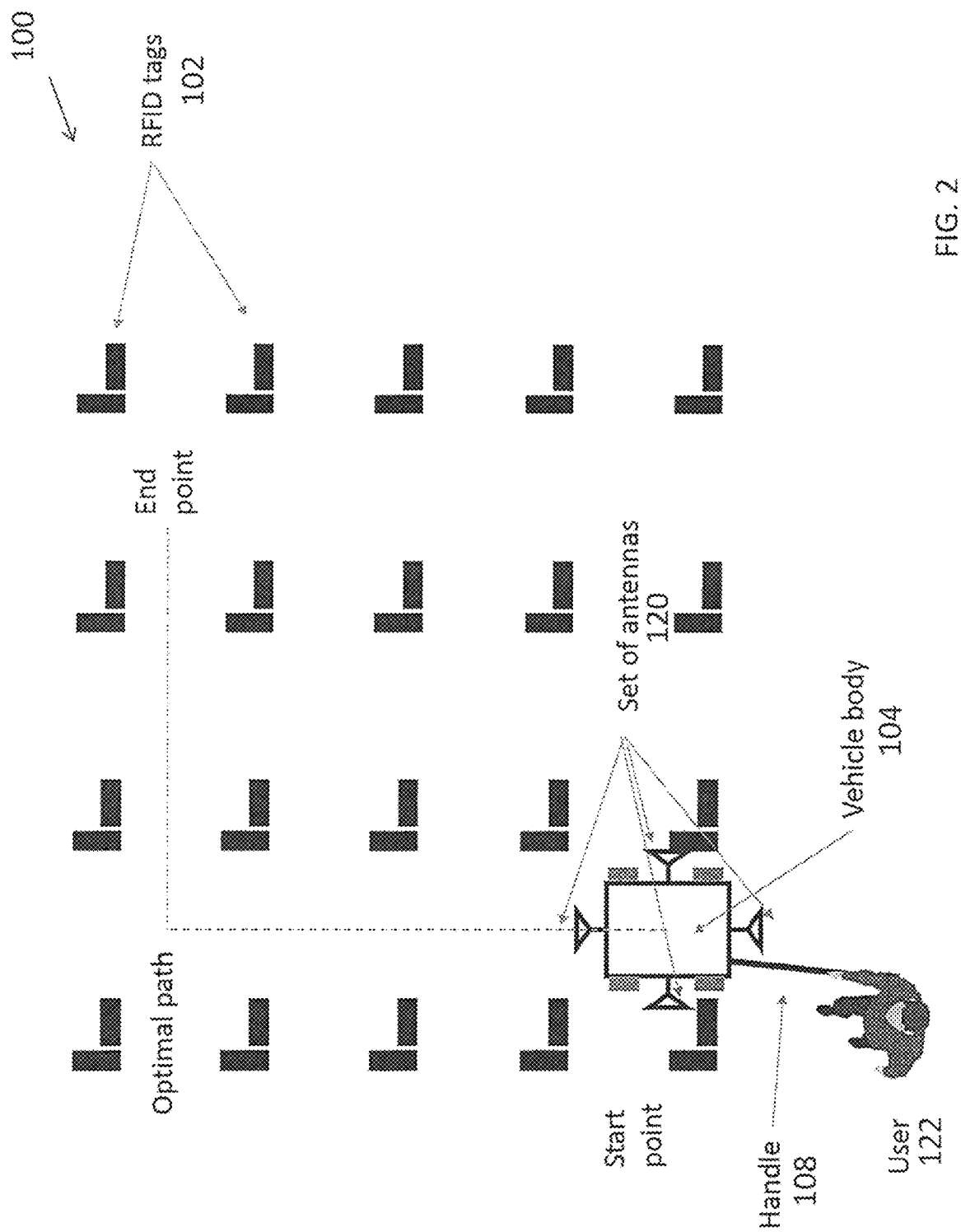
FIG. 2 is an illustration showing an example operation of the navigation system of FIG. 1, when a user is using the guide machine to navigate to the destination following a path determined by the navigation system.
Figure 3:
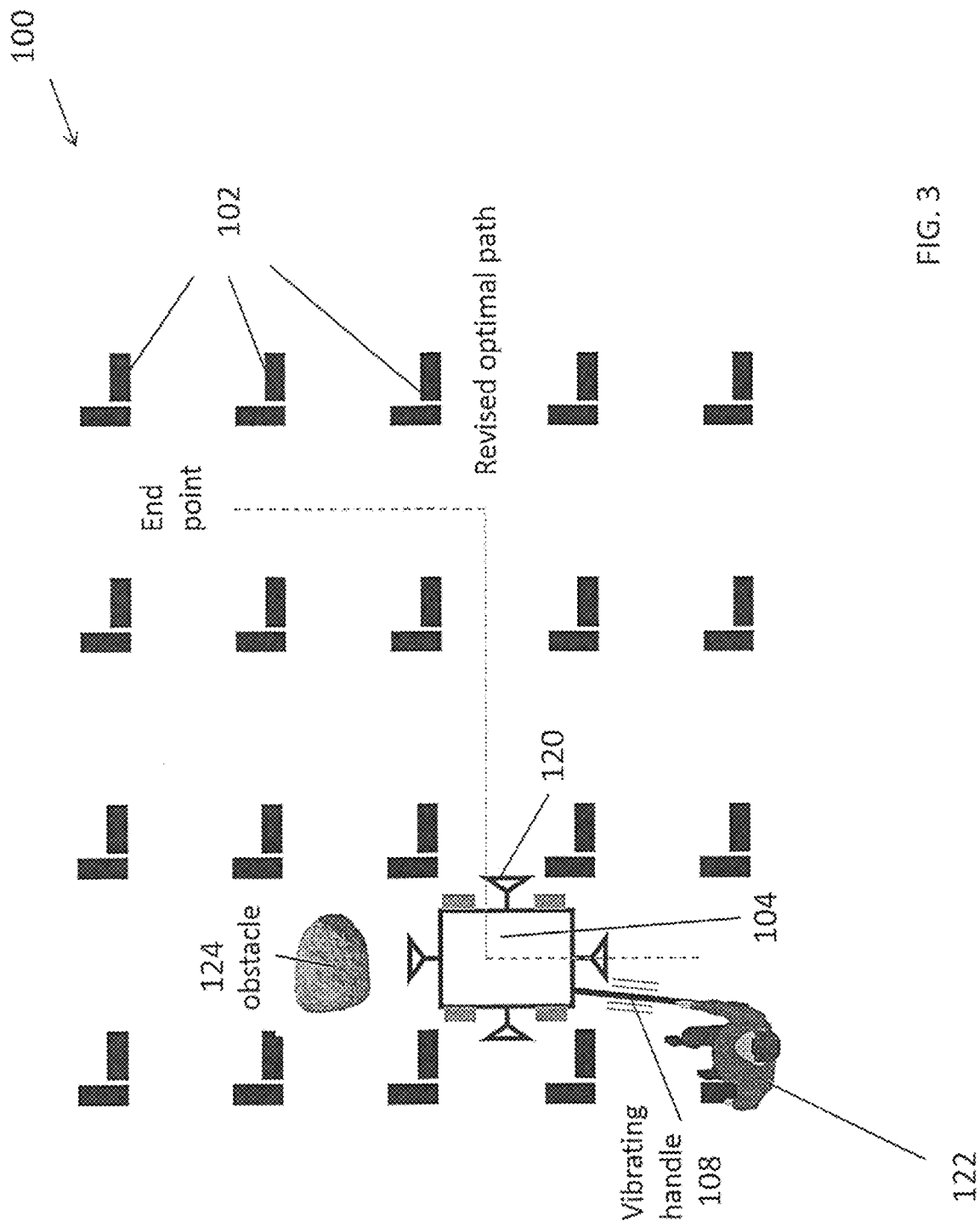
FIG. 3 is an illustration showing an example operation of the navigation system of FIG. 2, when the guide machine detects an obstacle and determine an alternative path for the user.

With reference to FIGS. 2 and 3, there is shown an example operation of the guide machine 104 being used by a user. In this example, the navigation system 100 may be used as a blind guide system based on RFID within a defined area.

In this example, the navigation system 100 comprises a guide machine 104 including a processor, a vibration handle 108, a multi-channel RFID reader and a set of RFID antennas 120. An array of RFID tags 102 has been installed under the ground. The vehicle body 104 is movable part of the system 100 and it may move on the area with installation of RFID tags array. Preferably, the vehicle body 104 comprises the processer, the vibration handle 108, the multi-channel RFID reader and the set of RFID antennas 120.

Extended from the vehicle body 104, there is provided a (rear) handle 108 which may be held by a user 122 when being used. The handle 108 may include or connect to a vibration generator for providing tactile signals to the user 122 holding the handle. Preferably, the tactile signals include vibration signals with different vibration patterns, frequencies and/or strengths, which may represent different guiding information to be provided to the user 122. The handle 108 may also vibrate at different frequencies that indicate different situations.

In a preferable example, the processor may control of the vehicle body movement, receives signals from a multi-channel RFID reader through the set of RFID antennas 120 and vibration frequency of the handle 108.

The set of RFID antennas 120, 4 to 8 antennas, are installed around the vehicle body 104 and are connected to the multi-channel RFID reader housed within the vehicle body 104. During each detection period, only single antenna may be switched on sequentially. The antenna radiation is preferably unidirectional and all antennas 120 are pointing at different directions. It results that processor may precisely differentiate the received RFID signal strengths from all antennas 120.

As discussed earlier, isolators may be installed between the adjacent antenna units in the set to reduce the mutual coupling between the antennas 120. The inventors devise that the isolator doesn't degrade the antenna performance but it makes the processer easier to differentiate the maximum signal received from which antenna unit.

The RFID tags array may be uniformly installed and distributed across the plane under the ground. Each RFID tag 102 may receive and transmit electromagnetic wave in linear polarization. In addition, two orthogonal RFID tags are installed in the same position and record the information of same position point. The processor also reads the strength of the signal from the RFID tags 102 and accordingly estimates the location of the vehicle body 104 by comparing the received signal strengths.

During each detection interval, the processor determines the received signal strength and averages of all received signal over a small interval. The tag ID may be associated with location information of all RFID tags 102 and are stored in a database. The system 100 may further include an input module arranged to receive an input of the destination in the predetermined area which allow the user to input the start point and the destination/end point. For example, the user may input a desired destination by directly enter geometrical coordinates or simple the UID of a specific tag to the system or the guide machine 104. Alternatively, it may also be possible that the input may be provided to the guide machine via other means such as inputting the locations to a smartphone which may be further communicated to the system 100 or the guide machine 104.

Upon determining the current position of the guide machine 104, the processor may further determine an optimal path for the guide machine 104 to travel towards the destination with reference to a map data that store all the location information of the tags 102.

Optionally or additionally, the guide machine 104 further comprises at least one sensor (not shown) arranged to detect an obstacle 124 on the path, and in response to the detection of the obstacle 124, the processor determine an alternative path for the guide machine 104 to travel from the current position to the destination.

With reference to FIG. 3, the guide machine 104 also collects sensing data from ultrasonic sensor and/or infrared sensor upon a detection of obstacle 124 that blocks the user from reaching the destination by following the optimal path obtained previously. Preferably, the process re-computes or revises the optimal path, such that the user may reach the destination by following an alternative path instead.

The processer may also control the vibration of the handle 108 once it revises the optimal path and informs the user about encountering obstacles 124 ahead. It also allow user to be noted that the path is going to change. For example, by changing a level of vibration of the handle 108, the user may then know that he should keep on walking, turn right or left, or stop.

These embodiments may be advantageous in that interactive robotic guide vehicle can provide accurate navigation information to a blind user which may be similar to relying on a guide dog, so that the user can readily switch to use a new interactive navigation system.

Advantageously, the combined used of multiple unidirectional antennas and the deployment of an array of orthogonally arranged RFID provides an easy but prominent solution to accurately determine the position of the guide machine.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of controlling a guide machine, comprising the steps of:
   providing a plurality of signal sources within a predetermined area, the plurality of signal sources arranged to form an array of signal sources;
   providing a guide machine with a plurality of unidirectional antennas installed around the guide machine, the plurality of unidirectional antennas orthogonally arranged, to receive electromagnetic signals emitted from the plurality of signal sources facing the plurality of unidirectional antennas;

receiving, by the plurality of unidirectional antennas, electromagnetic signals emitted from one or more of the plurality of signal sources;

processing the electromagnetic signals to identify the locations of the signal sources;

determining a current position of the guide machine with reference to the locations of the signal sources; and determining a path for the guide machine to travel from the current position to a destination in the predetermined area;

wherein the method further comprises the step of providing a plurality of unidirectional antennas surrounding the guide machine along the plane, the plurality of unidirectional antennas are orthogonally arranged to receive electromagnetic signals emitted from the plurality of signal sources facing the plurality of unidirectional antennas, and wherein the array of signal sources comprises an array of RFID tags disposed under a ground surface, wherein each signal source of the array of signal sources comprises a first RFID tag and a second RFID tag arranged orthogonally to the first RFID tag, the first and second RFID tags being positioned at a given location with record information of the given location, the first RFID tag emitting electromagnetic signals along a first direction and the second RFID emitting electromagnetic signals along a second direction orthogonal to the first direction.

2. The method in accordance with claim 1, wherein the electromagnetic signals are transmitted in a linear polarization.

3. The method in accordance with claim 1, wherein the step of processing the electromagnetic signals include determining a distance and a direction of each of the signal sources based on a signal strength of each of the electromagnetic signals emitted by each respective signal source in the orthogonal directions.

4. The method in accordance with claim 1, wherein the step of receiving electromagnetic signals further comprising the step of detecting the plurality of signal sources periodically at detection intervals, and sequentially receiving electromagnetic signals in each respective direction of the plurality of antennas in each of the detection intervals.

5. The method in accordance with claim 1, further comprising the step of:
detecting an obstacle on the path; and
determining an alternative path for the guide machine to travel from the current position to the destination.

6. The method in accordance with claim 5, further comprising the step of informing a user of the guide machine detection of the obstacle.

7. The method in accordance with claim 1, further comprising the step of: providing to a user instructions associated with travelling along the path of the guide machine using tactile signals.

8. The method in accordance with claim 7, wherein the tactile signals include vibration signals with different vibration patterns, frequencies and/or strengths.

9. A navigation system comprising:
a plurality of signal sources within a predetermined area, the plurality of signal sources arranged to form an array of signal sources;
a guide machine including a signal receiver comprising a plurality of unidirectional antennas installed around the guide machine, the plurality of unidirectional antennas orthogonally arranged to receive electromagnetic signals emitted from one or more of the plurality of signal sources facing the unidirectional antennas; and a processor arranged to process the electromagnetic signals to identify the locations of the signal sources, and thereby to determine a current position of the guide machine with reference to the locations of the signal sources; and the processor is further arranged to determine a path for the guide machine to travel from the current position to a destination location in the predetermined area, and wherein the array of signal sources comprises an array of RFID tags disposed under a ground surface, wherein each signal source of the array of signal sources comprises a first RFID tag and a second RFID tag arranged orthogonally to the first RFID tag, the first and second RFID tags being positioned at a given location with record information of the given location, the first RFID tag emitting electromagnetic signals along a first direction and the second RFID emitting electromagnetic signals along a second direction orthogonal to the first direction.

10. The navigation system in accordance with claim 9, wherein the electromagnetic signals are transmitted in a linear polarization.

11. The navigation system in accordance with claim 9, wherein the processer is arranged to determine a distance and a direction of each of the signal sources based on a signal strength of each of the electromagnetic signals emitted by each respective signal source in the orthogonal directions.

12. The navigation system in accordance with claim 9, wherein the signal receiver is arranged to sequentially receive electromagnetic signals in each respective direction of the plurality of antennas.

13. The navigation system in accordance with claim 9, wherein the plurality of antennas are electromagnetically separated so as to minimize mutual coupling between adjacent pairs of antennas.

14. The navigation system in accordance with claim 13, wherein the guide machine further comprises an electromagnetic isolator disposed between each of the adjacent pairs of antennas.

15. The navigation system in accordance with claim 9, wherein the signal receiver includes a multi-channel RFID reader.

16. The navigation system in accordance with claim 9, wherein the guide machine further comprises at least one sensor arranged to detect an obstacle on the path.

17. The navigation system in accordance with claim 16, wherein the processor is further arranged to, in response to the detection of the obstacle, determine an alternative path for the guide machine to travel from the current position to the destination.

18. The navigation system in accordance with claim 16, wherein the at least one sensor includes at least one of an infrared sensor and an ultrasonic sensor.

19. The navigation system in accordance with claim 9, wherein the guide machine further comprises a handle arranged to provide to a user instructions associated with travelling along the path of the guide machine using tactile signals.

20. The navigation system in accordance with claim 19, wherein the tactile signals include vibration signals with different vibration patterns, frequencies and/or strengths.

21. The navigation system in accordance with claim 9, further comprising an input module arranged to receive an input of the destination in the predetermined area.

22. The navigation system in accordance with claim 9, wherein the guide machine includes a robotic guide vehicle.

* * * * *

UNITED STATES PATENT AND TRADEMARK OFFICE
CERTIFICATE OF CORRECTION

PATENT NO. : 11,703,881 B2
APPLICATION NO. : 16/823558
DATED : July 18, 2023
INVENTOR(S) : Xiao Sheng Chen et al.

It is certified that error appears in the above-identified patent and that said Letters Patent is hereby corrected as shown below:

In the Claims

In Claim 1, Column 7, Lines 14-16, the following should be deleted:
"the method further comprises the step of providing a pluality of unidirectional antennas surrounding the guide machine along the plane,"

Signed and Sealed this
Fifth Day of November, 2024

Katherine Kelly Vidal
*Director of the United States Patent and Trademark Office*